United States Patent [19]
Gorday et al.

[11] Patent Number: 5,703,570
[45] Date of Patent: Dec. 30, 1997

[54] METHOD AND APPARATUS FOR INDICATING UNDELIVERED MESSAGES IN A COMMUNICATION DEVICE

[75] Inventors: Paul Edward Gorday; Xuan-Khanh Tran Gorday, both of West Palm Beach; Sunil Satyamurti, Delray Beach, all of Fla.

[73] Assignee: Motorola, Inc., Schaumburg, Ill.

[21] Appl. No.: 515,845

[22] Filed: Aug. 16, 1995

[51] Int. Cl.⁶ .................................................. G08B 5/22
[52] U.S. Cl. .............................. 340/825.44; 340/311.1; 455/38.1
[58] Field of Search ................ 340/825.44, 825.47, 340/825.54, 311.1, 825.36, 825.49; 379/57, 58, 59, 94; 455/33.1, 38.1, 56.1

[56] References Cited

U.S. PATENT DOCUMENTS

| | | | |
|---|---|---|---|
| 4,868,560 | 9/1989 | Oliwa et al. | 340/825.44 |
| 4,872,005 | 10/1989 | De Luca et al. | 340/825.44 |
| 4,928,096 | 5/1990 | Leonardo et al. | 340/825.44 |
| 4,940,963 | 7/1990 | Gutman et al. | 340/825.44 |
| 5,315,642 | 5/1994 | Fernandez | 340/825.44 |
| 5,333,266 | 7/1994 | Boaz et al. | 395/200 |
| 5,396,537 | 3/1995 | Schwendeman | 340/825.44 |
| 5,428,667 | 6/1995 | Easterling | 379/59 |
| 5,530,437 | 6/1996 | Goldberg | 340/825.44 |
| 5,530,918 | 6/1996 | Jasinski | 340/825.44 |

*Primary Examiner*—Nimeshkumar Patel
*Assistant Examiner*—Edward Merz
*Attorney, Agent, or Firm*—James A. Lamb

[57] ABSTRACT

A method and apparatus is for use in a radio communication system (100) for delivering a message from a system controller (102) to a selective call device. In the system controller (102) the method includes the steps of generating a first message intended for the selective call device (106), changing a delivery state of the first message to undelivered after the first message has been transmitted at least once from the system controller (102), and storing the first message in the system controller (102) when the delivery state is changed to undelivered. In the selective call device the method includes the steps of determining that the first message is stored in the system controller (102) and presenting user with information which indicates that an undeliverable message is being stored by the system controller (102) in response to determining that the first message (102) is stored in the system controller (102).

17 Claims, 6 Drawing Sheets

METHOD AND APPARATUS FOR INDICATING UNDELIVERED MESSAGES IN A COMMUNICATION DEVICE

FIELD OF THE INVENTION

This invention relates in general to delivering messages in communication systems and in particular to indicating to a user of a selective call device a non-delivery of an outbound message generated and transmitted by a system controller, so that a user can retrieve the outbound message at a later time.

BACKGROUND OF THE INVENTION

In a radio communication system having a fixed system controller with a fixed transceiver and a plurality of portable selective call radios, there are typically regions near the perimeter of a coverage area and areas within the coverage area having strong electrical noise where communication may not be reliable. In these regions, when the portable selective call radio's are of the type which generate an acknowledgment for a reception of an outbound message from the fixed system controller, a portable selective call radio typically will not generate an acknowledgment for a message received with non correctable errors or poor audio quality, or alternatively will respond with a non-acknowledgment. At regions farther from the system transmitter or in areas of stronger electrical noise, messages are not received at all (that is, the signal to noise ratio is so low that the selective call radio is not able to decode its selective call address) in which case no inbound acknowledgment is generated. In regions closer to the fixed transmitter, messages are received with an acceptable quality indication, in which case an acknowledgment is transmitted by the selective call radio. The system controller typically re-transmits outbound messages that have not been acknowledged a predetermined number of times and then returns the outbound message to an originator of the outbound message, or returns an indication to the originator that the message was not delivered. The undelivered message is removed from storage in the system controller or other apparatus within the communication system. The originator must then re-initiate the message to the selective call radio at a later time. The selective call radio may or may not be able to receive the message from system transmitter upon re-transmission and the process may have to be repeated.

While this approach works well in many systems, it results in non-delivery of an outbound message when the portable selective call radio is in a high electrical noise region or near the perimeter of the system transmitters coverage area. A non-delivered message generates additional system traffic as the system tries repeatedly to deliver the message before returning the message to the originator. Non-delivered messages that must be re-entered by the originator cause inconvenience to the users and can effect the commercial success of the system. The present art thus relies on a hit or miss system of re-transmissions, with delivery being dependent on the portable selective call radio being within a region having a good signal to noise ratio during one of the re-transmissions. Thus, what is needed is an improved method for accomplishing the delivery of outbound messages to a portable selective call radio which is near the perimeter of a system transmitter's coverage area or in a region of strong electrical noise in the radio communication system.

SUMMARY OF THE INVENTION

Accordingly, in a first aspect of the present invention, a method is used in a radio communication system for delivering a message from a system controller to a selective call device. In the system controller the method includes the steps of generating a first message intended for the selective call device, changing a delivery state of the first message to undelivered after the first message has been transmitted at least once from the system controller, and storing the first message in the system controller when the delivery state is changed to undelivered. In the selective call device the method includes the steps of determining that the first message is stored in the system controller and presenting user with information which indicates that an undeliverable message is being stored by the system controller in response to determining that the first message is stored in the system controller.

Accordingly, in a second aspect of the present invention a selective call device is for receiving a first message generated by a system controller of a radio communication system. The selective call device includes a receiver which receives a second message from the system controller which indicates that a delivery state of the first message has been changed to undelivered. The delivery state is maintained by the system controller. A processing system is coupled to the receiver. The processing system determines that the first message is stored in the system controller when the second message is received and generates user information which indicates that an undeliverable message is being stored by the system controller when the second message is received. A display, which is coupled to the processing system, displays the user information.

Accordingly, in a third aspect of the present invention, a selective call device is for receiving a first message generated by a system controller of a radio communication system. The selective call device includes a receiver which receives the first message at least once from the system controller. A processing system which is coupled to the receiver, makes a determination that the first message is stored in the system controller in response to receiving a predetermined number of transmissions of the first message for which a quality indication is within an undeliverable range of values. The processing system generates user information which indicates that the first message is being stored by the system controller in response to the determination. A display, which is coupled to the processing system, displays the user information.

Accordingly, in a fourth aspect of the present invention, a system controller is for delivering a first message to a selective call device. The system controller includes a processing system which generates the first message intended for the selective call device, changes a delivery state of the first message to undelivered after the first message has been transmitted at least once from the system controller, and stores the first message when the delivery state is changed to undelivered. A cell site controller, which is coupled to the processing system, transmits the first message.

DESCRIPTION OF THE PREFERRED EMBODIMENTS

Figure 1:
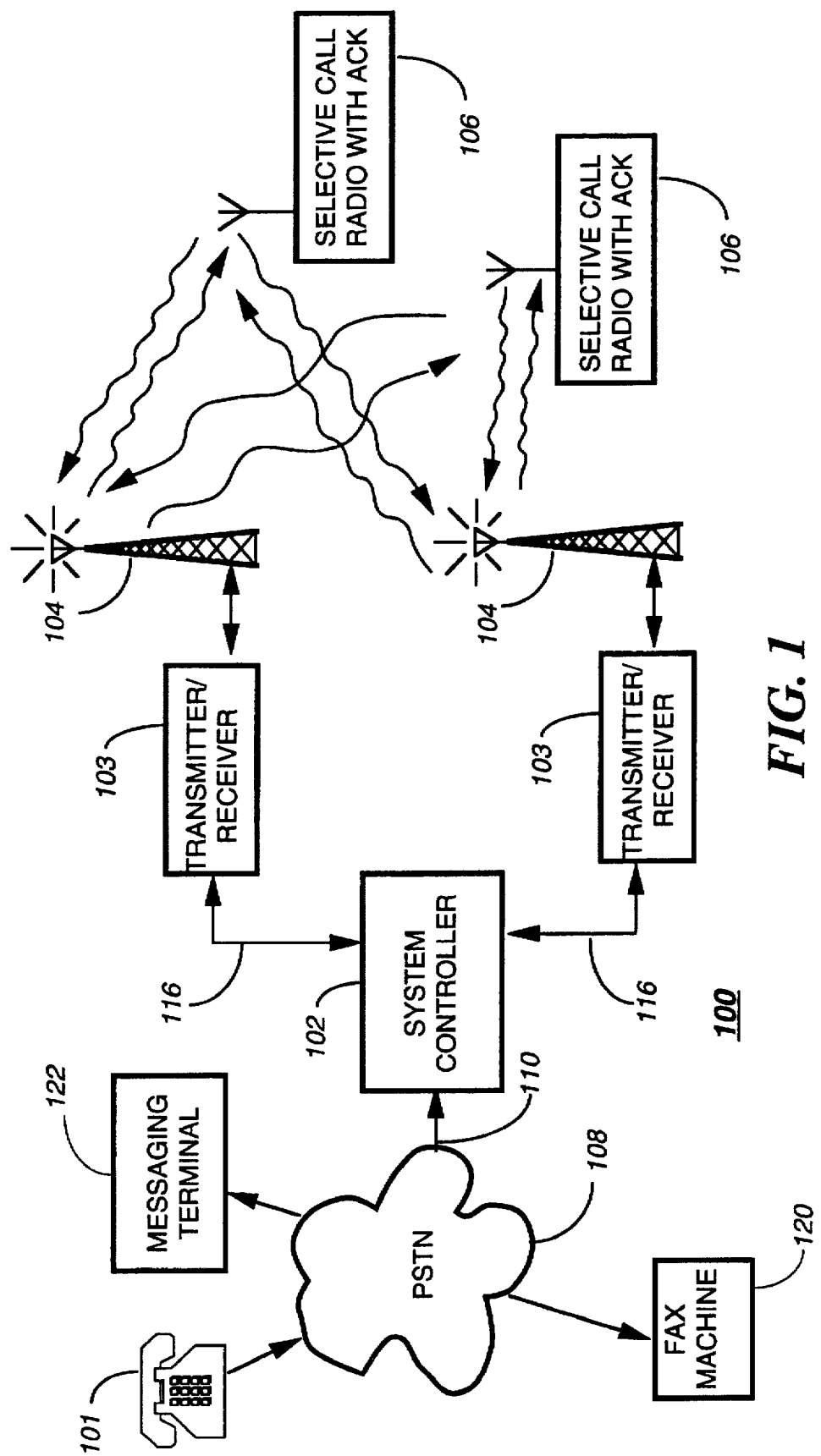
FIG. 1 is an electrical block diagram of a radio communication system, in accordance with the preferred embodiment of the present invention.

FIG. 1 is an electrical block diagram of a radio communication system 100 incorporating the improved method of message delivery in accordance with the preferred and alternative embodiments of the present invention. The communication system 100, by way of example, is radio paging system, however it will be appreciated that many different types of communications systems will benefit by the present invention. The present invention takes advantage of the ability of communication systems to more successfully communicate short messages than longer messages, particularly where the short message is a digital message. Short messages typically have a substantially higher probability of successful reception than longer messages: In situations where attempts to deliver a primary or first message have failed, the present invention defers the transmission of the first message and uses a short second message to inform the message recipient of the action taken or to direct the message originator to take a specific action. It will be appreciated that the short second message can also include a more robust encoding method to further enhance the potential of successful communication. An example of a more robust encoding method is a method that includes redundancy.

The radio communication system 100 comprises a message input device, such as a conventional telephone 101, a facsimile machine 120 or a messaging terminal 122, connected through a conventional public switched telephone network (PSTN) 108 by conventional telephone links 110 to a system controller 102. Messages transmitted between the system controller 102 and portable subscriber units (PSU) 106 in this example comprise outbound voice messages, alphanumeric messages, response messages and unsolicited messages. Each PSU 106 is also herein referred to as a selective call device 106 or a selective call radio 106. An example of an outbound alphanumeric message intended for a PSU 106 is an alphanumeric page message entered from the messaging terminal 122. An example of an outbound analog message intended for a PSU 106 is a voice page message entered from the telephone 101. Examples of response messages are acknowledgments and demand response messages. An acknowledgment is an inbound message transmitted by a PSU 106 which indicates successful reception of an outbound message. A demand response message is a message sent from a PSU 106 in response to a command included in an outbound message from the system controller 102. An example of a demand response message is a text message initiated by the PSU 106, but which is not transmitted until after a demand response command is received from the system controller 102. The demand response command, in turn, was sent by the system controller 102 after an inbound message requesting permission to transmit the demand response message was communicated from the PSU 106 to the system controller 102. A demand response message is typically transmitted by a PSU 106 at a time scheduled by the system controller 102 and designated within an outbound demand message. Alternatively the demand response message is transmitted using an unscheduled technique which is a slotted ALOHA protocol, well known to one of ordinary skill in the art. When the demand response is transmitted using an ALOHA protocol, it is called a demand ALOHA response message. An unsolicited message is an inbound message transmitted by a PSU 106 without having received an outbound message which requires a response. An example of an unsolicited message is an inbound message from a PSU 106 which alerts the radio communication system 100 that the PSU 106 is within radio range of the radio communication system 100. An unsolicited message can include a request to transmit a scheduled or demand response which can include data such as alphanumeric data. Unsolicited messages are transmitted using the slotted ALOHA protocol. The inbound and outbound messages are included in outbound radio signals transmitted from, and inbound radio signals received by, a conventional antenna 104 coupled to the radio frequency transmitter/receiver 103.

According to the preferred embodiment of present invention, when the system controller 102 generates a first message intended for the PSU 106 and when the PSU 106 transmits a non-acknowledgment (NACK) message indicating that the message received was determined to have an unacceptable quality indication, after several attempts by the system controller to deliver the first message by re-transmissions of the first message, the status of the first message is changed from delivery pending to undelivered. The first message is stored in the system controller, a second message is sent indicating that the first message has not been delivered and a display message is presented to the user of the PSU 106, which indicates that the first message was not delivered and is being stored by the system controller. The display message can also indicate an action to be taken by the user of the PSU 106. The user of the PSU 106 is then able to request a re-transmission of the first message, with a third message, at a later time preferably from a different location. It will be appreciated that, once the intended recipient is notified, an alternative means of delivery can also be used, for example, voice mail and email. Upon activation of controls by the user, the PSU 106 transmits a third message requesting re-transmission of the first message. In the case where the first message received is of poor quality, but with a sufficiently low error rate that the PSU 106 is able to determine that it is the intended recipient and the PSU 106 is able to communicate a NACK to the system controller 102, this method of message handling reduces system traffic, eliminating the necessity of failed messages to be re-entered by the originator and the resulting user inconvenience. In the case where no usable communications exists between the PSU 106 and the controller 102 the first message can be optionally stored or the first message can be handled in a conventional manner. This process is described in more detail below in reference to FIGS. 4 through 8.

The system controller 102 oversees the operation of a plurality of radio frequency transmitter/receivers 103, through one or more communication links 116, which are, for example, a twisted pair telephone circuit. RF, microwave, or other high quality communication links can also be used to provide the communication links 116. The system controller 102 encodes and decodes inbound and outbound telephone addresses into formats that are compatible with land line message switch computers. The system controller 102 also functions to encode and schedule outbound messages, which can include such information as analog voice messages, digital alphanumeric messages, and response commands, for transmission by the radio frequency transmitter/receivers 103 to a plurality of PSU 106. The system controller 102 further functions to decode inbound messages, including unsolicited and response messages, received by the radio frequency transmitter/receivers 103 from the plurality of PSUs 106.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network. Moreover, as one of ordinary skill in the art would recognize, the telephonic and selective call radio communication system functions may reside in separate system controllers 102 which operate either independently or in a networked fashion.

It will be appreciated that the PSU 106 is one of several types of radios, including two way pagers, conventional mobile radios, conventional or trunked mobile radios which have a data terminal attached thereto, or which optionally have data terminal capability designed in. Each of the PSUs 106 assigned for use in the radio communication system 100 has an address assigned thereto which is a unique selective call address. The address enables the transmission of a message from the system controller 102 only to the addressed PSU 106, and identifies messages and responses received at the system controller 102 from the PSU 106. Furthermore, each of one or more of the PSU 106 can have a unique telephone number assigned thereto, the telephone number being unique within the PSTN 108. A list of the assigned selective call addresses and correlated telephone numbers for the PSUs 106 is stored in the system controller 102 in the form of a subscriber data base.

Figure 2:
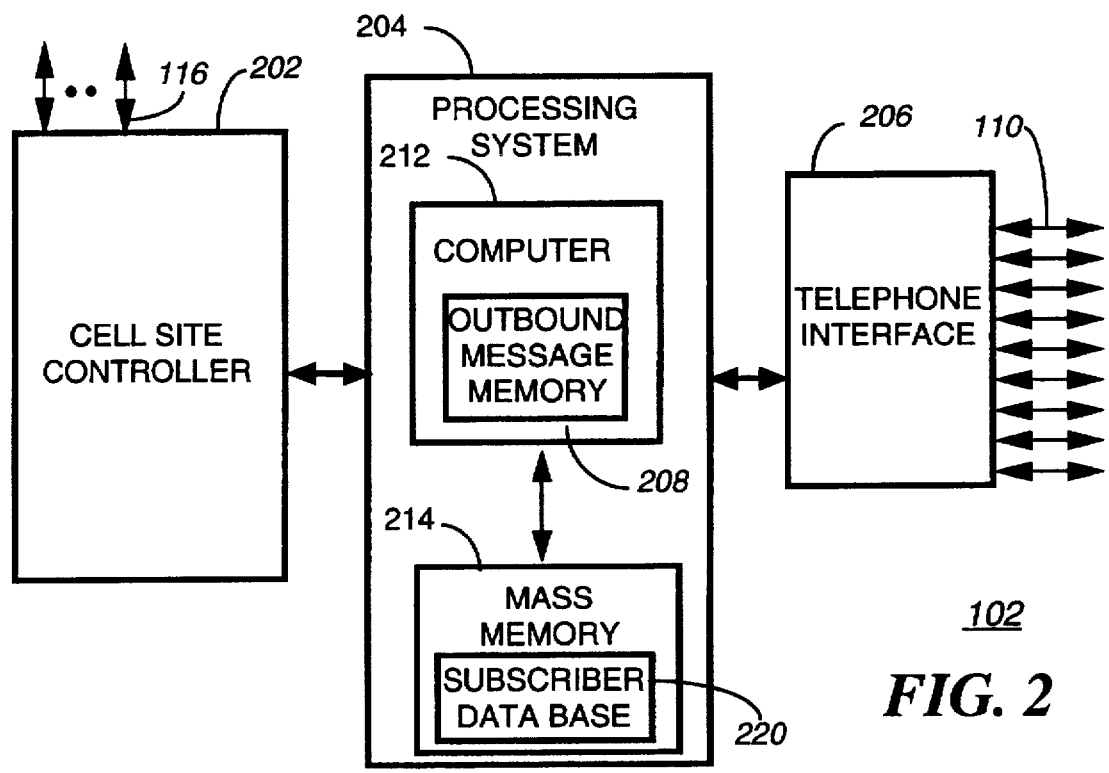
FIG. 2 is an electrical block diagram of a system controller used in the radio communication system shown in FIG. 1, in accordance with the preferred and alternative embodiments of the present invention.

Referring to FIG. 2, an electrical block diagram of the system controller 102 is shown, in accordance with the preferred and alternative embodiments of the present invention. The system controller 102 queues data and stored voice messages for transmission to the PSUs 106, connects telephone calls for transmission to the PSUs 106, and receives acknowledgments, demand responses, unsolicited data and stored audio messages, and telephone calls from the PSUs 106.

The system controller 102 comprises a cell site controller 202, a processing system 204, an outbound message memory 208, a subscriber data base 220, and a telephone interface 206. The cell site controller 202 is coupled to the radio frequency transmitter/receivers 103 (FIG. 1) by the links 116. The cell site controller 202 transmits outbound messages which include selective call addresses to the transmitter/receivers 103 and controls the transmitter/receivers 103 to transmit radio transmission cycles which include the outbound messages, using one or more outbound channels as scheduled by a message handler function. The cell site controller 202 also receives inbound messages from the PSUs 106. The inbound messages are received by the transmitter/receivers 103 on a set of inbound radio channels, and are coupled to the cell site controller 202. The processing system 204, which includes the message handler function for routing and processing messages, is coupled to the cell site controller 202, a telephone interface 206, the subscriber data base 220, and the outbound message memory 208. The telephone interface 206 handles the PSTN 108 (FIG. 1) physical connection, connecting and disconnecting telephone calls at the telephone links 110, and routing the audio signals between the telephone links 110 and the processing system 204.

The subscriber data base 220, which is coupled to the processing system 204, stores information for each subscriber, including a correlation between a selective call address assigned to each PSU 106 and the telephone number used within the PSTN 108 to route messages and telephone calls to each PSU 106, as well as other subscriber determined preferences, such as hours during which messages are to be held back from delivery to the PSU 106. The outbound message memory 208 is for storing a queue of messages which are queued for delivery to at least one of the plurality of PSUs 106, wherein each message of the queue of messages is associated with a selective call address, also stored in the outbound message memory 208, of one of the plurality of PSUs 106 for which each message is intended.

The message handler function also identifies inbound messages as being associated with one of the PSUs 106 in the subscriber data base 220 and identifies response messages as being associated with one of the outbound messages in the outbound message memory 208. As one example of an operation of the system controller 102, the delivery of an outbound message stored in the outbound message memory 208 is completed when: the outbound message has been communicated to the intended PSU 106; the outbound message is acknowledged by an inbound acknowledgment generated by the PSU 106; the outbound message is presented on a display of the PSU 106 by a user action; a user inbound response is generated by a user and communicated back to the system controller 102 from the PSU 106; and the user inbound response is identified by the message handler function as having been generated by the user specifically in response to the outbound message. In this example, the message handler function generates another message which is sent to the originator of the outbound message to notify the originator that the outbound message has been acknowledged by the PSU 106 and responded to by the user of the PSU 106.

The system controller 102 schedules transmissions of the demand responses and acknowledgments from the PSUs 106. The scheduling of inbound messages under certain circumstances improves the throughput of the inbound channel in comparison to that achievable for an unscheduled, random input inbound channel organization scheme such as that used in an ALOHA system. A scheduled inbound channel may utilize a portion of the total time available in a half duplex single frequency radio channel (a single radio carrier frequency which is time shared for both outbound and inbound channels). Alternatively, the scheduled inbound channel may be some portion of the time available, or all of the time available, in a channel having a radio carrier frequency which is different than the outbound channel radio frequency. System controller 102 is preferably a model MPS2000® paging terminal manufactured by Motorola, Inc., of Schaumburg Ill. The processing system 204 preferably includes a conventional computer system 212, and conventional mass storage media 214. The conventional computer system 212 preferably comprises a plurality of processors such as VME Sparc processors manufactured by Sun Microsystems, Inc. These processors include memory such as dynamic random access memory (DRAM), which serves as a temporary memory storage device for scratch pad processing such as, for example, the outbound message memory 208, acknowledgments received from the PSU 106, and for formatting of messages destined for the PSU 106. The conventional mass storage media 214 is preferably a conventional hard disk mass storage device. The subscriber data base 220 is preferably stored in the conventional mass storage media 214.

It will be appreciated that other types of conventional computer systems 212 can be utilized, and that additional computer systems 212 and mass storage media 214 of the same or alternate type can be added as required to handle the processing requirements of the processing system 204.

The processing system 204 performs functions including the message handler functions described above, which are conventional, and functions described below with reference to FIGS. 4 through 8 which are unique. The conventional and unique functions are executed by the conventional computer system 212 and controlled by a set of program instructions stored in the mass storage media 214. The unique functions are controlled by a unique set of program codes generated using conventional programming tools. The cell site controller 202 and the telephone interface 206 are implemented using conventional input/output sections of the model MPS2000® paging terminal.

The radio communication system 100 of the present invention preferably uses the InFLEXion™ protocol (a high speed two way paging protocol by Motorola, Inc. of Schaumburg, ILL.) on the outbound and inbound channels for addressing, digital messaging, and voice messaging, but the system controller 102 and PSU 106 in accordance with the preferred embodiment of the present invention can be used in other radio communication systems using other protocols which can support acknowledgment and non-acknowledgment messages, such as the DataTAC® 400 wireless packet-data communications system technology used in the data communication system operated by the ARDIS network, which is a nationwide data packet network owned by Motorola, Inc., of Schaumburg, ILL.

Figure 3:
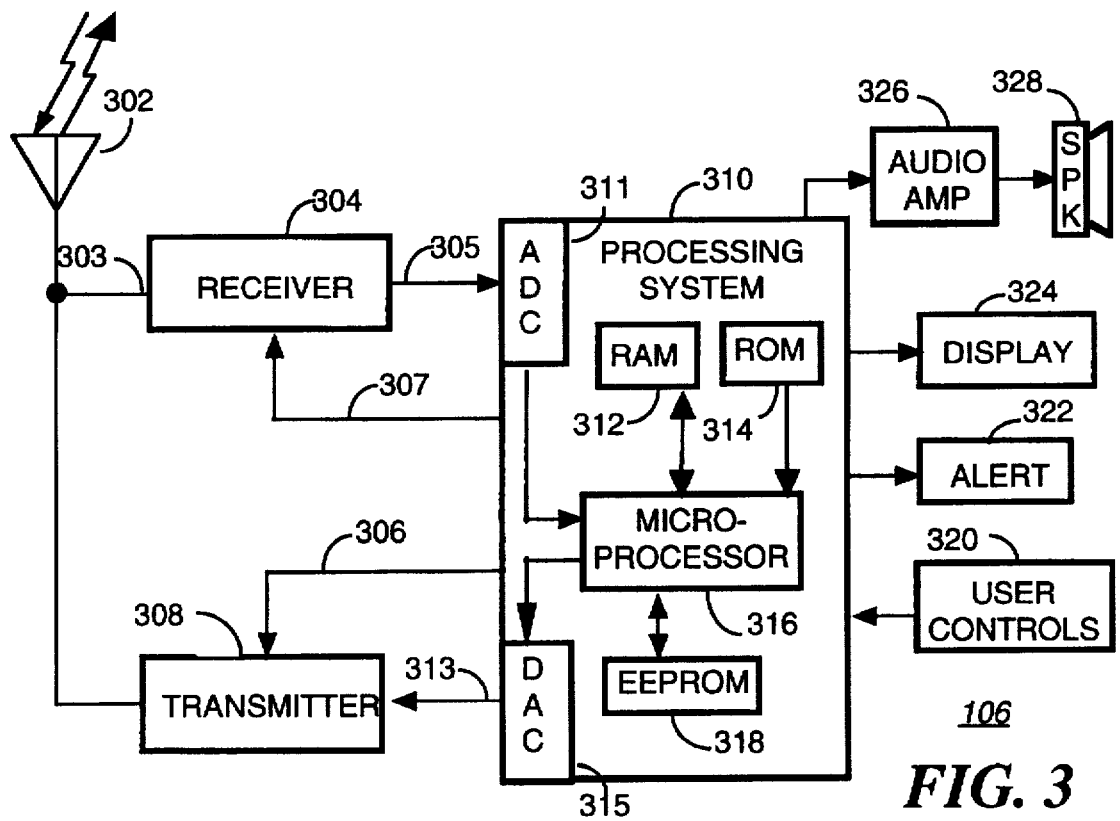
FIG. 3 is an electrical block diagram of a selective call receiver used in the radio communication system shown in FIG. 1, in accordance with the preferred and alternative embodiments of the present invention.

Referring to FIG. 3, an electrical block diagram of a multi-channel PSU 106 is shown, in accordance with the preferred and alternative embodiments of the present invention. The PSU 106 includes an antenna 302 for intercepting and transmitting radio signals. The antenna 302 is coupled to a conventional receiver 304 wherein the intercepted signal 303, described above with reference to FIG. 1, is received. Receiving includes filtering to remove undesirable energy at off channel frequencies, amplification of the filtered signal, frequency conversion of the signal 303, and demodulation of the signal 303 in a conventional manner. The receiver 304 thereby generates a demodulated signal 305 which is coupled to a processing system 310. It will be appreciated by one skilled in the art that the signal received by the receiver 304 can alternatively be demodulated by the processing system 310. The receiver 304 also has a power control input 307 coupled to the processing system 310. The processing system 310 is coupled to a display 324, an alert device 322, an audio amplifier 326, a transmitter 308, and a set of user controls 320. The transmitter 308 is coupled to the processing system 310 by a modulation signal 313 and a channel control signal 306, and is also coupled to the antenna 302. The audio amplifier 326 is coupled to a speaker 328. The processor section comprises a microprocessor which is coupled to an analog to digital converter (ADC) 311, a digital to analog converter (DAC) 315, a random access memory (RAM) 312, a read only memory (ROM) 314, and an electrically erasable programmable read only memory (EEPROM) 318. The demodulated signal is coupled to the ADC 311. The processing system 310 is coupled to the transmitter by the DAC 315. The ADC 311 converts the demodulated signal from an analog signal to a digital signal in a conventional manner, for processing by the processing system 310. A message processor function decodes outbound words and processes an outbound message when an address received within the outbound signaling protocol matches an embedded address stored in the EEPROM 318, in a manner well known to one of ordinary skill in the art for a selective call device 106. An outbound message which has been determined to be for the PSU 106, by matching the address, decoded from the out bound message, with the embedded address stored in the EEPROM 318, is processed by the message processor function according to the contents of the outbound message and according to modes set by manipulation of the set of user controls 320, in a conventional manner. An alert signal is typically generated when an outbound message includes user information. The alert signal is coupled to the alert device 322, which is typically either an audible or silent alerting device.

When the outbound message includes alphanumeric or graphic information, the information is displayed on the display 324 in a conventional manner by a display function at a time determined by manipulation of the set of user controls 320. When the outbound message includes audio information which is voice, the message handling function converts the voice signal to an analog signal which is coupled to the speaker 328 through the audio amplifier 326, which amplifies the signal in a conventional manner. Inbound messages are generated in digital form by a inbound message function, typically in response to user manipulation of the set of controls 320 or in response to an event detected by the processing system 310, such as receipt of an outbound message or occurrence of a predetermined time of day, in a conventional manner. An inbound message is generated and encoded for the inbound (reverse) channel communication and coupled to the DAC 315, wherein it is converted to an analog signal which modulates the transmitter 308, in a manner well known to one of ordinary skill in the art. The conventional transmitter 308 generates an RF signal, which is transmitted by the antenna 302.

The RAM 312, the EEPROM 318, the ADC 311 and the DAC 315 are preferably conventional parts. The ROM 314 is a conventional part having a unique set of masked program instructions, a portion of which perform the unique functions which are described below. Preferably, the microprocessor 316 is similar to the DSP56100 digital signal processor (DSP) manufactured by Motorola, Inc. It will be appreciated that other similar processors can be utilized for the microprocessor 316, and that additional processors of the same or alternate type can be added as required to handle the processing requirements of the processing system 310. It will be appreciated that other types of memory, e.g., ultraviolet erasable programmable read only memory (UVEPROM) or flash ROM, can be alternatively utilized for the ROM 314, as well as the RAM 312. It will be further appreciated that the RAM 312, the EEPROM 318, the ADC 311, the DAC 315, and the ROM 314, singly or in combination, can be integrated as a contiguous portion of the microprocessor 316.

The processing system 310 performs functions including at least portions of the bit recovery, synchronization, block word decoding, message processing, display, message handling, and inbound message generation described above, which are conventional, and other functions described below with reference to FIGS. 4 through 8, which are unique. The conventional and unique functions are executed by the microprocessor 316 which is a conventional microprocessor controlled by a set of program codes stored in the ROM 314. The unique functions are controlled by a unique set of program codes generated using conventional programming tools.

It will be appreciated that the processing system 310 can be alternatively implemented without the microprocessor 316, by implementing the conventional and unique functions described herein with a combination of conventionally available off the shelf integrated circuits such as CMOS shift registers, clocks, gates, counters, DAC, ADC, and RAM, and that further, some or all of the conventionally available off the shelf integrated circuits used to implement the processing system can be alternatively implemented in an application specific integrated circuit. When the processing system 310 is implemented without the microprocessor 316, the conventional and unique functions are generated by the choice and interconnection of the conventional circuits. It will be further appreciated that the microprocessor 316 can alternatively be a conventional microprocessor, such as a microprocessor in the family of 68HC11 microprocessors manufactured by Motorola, Inc., of Schaumburg, ILL.

Figure 4:
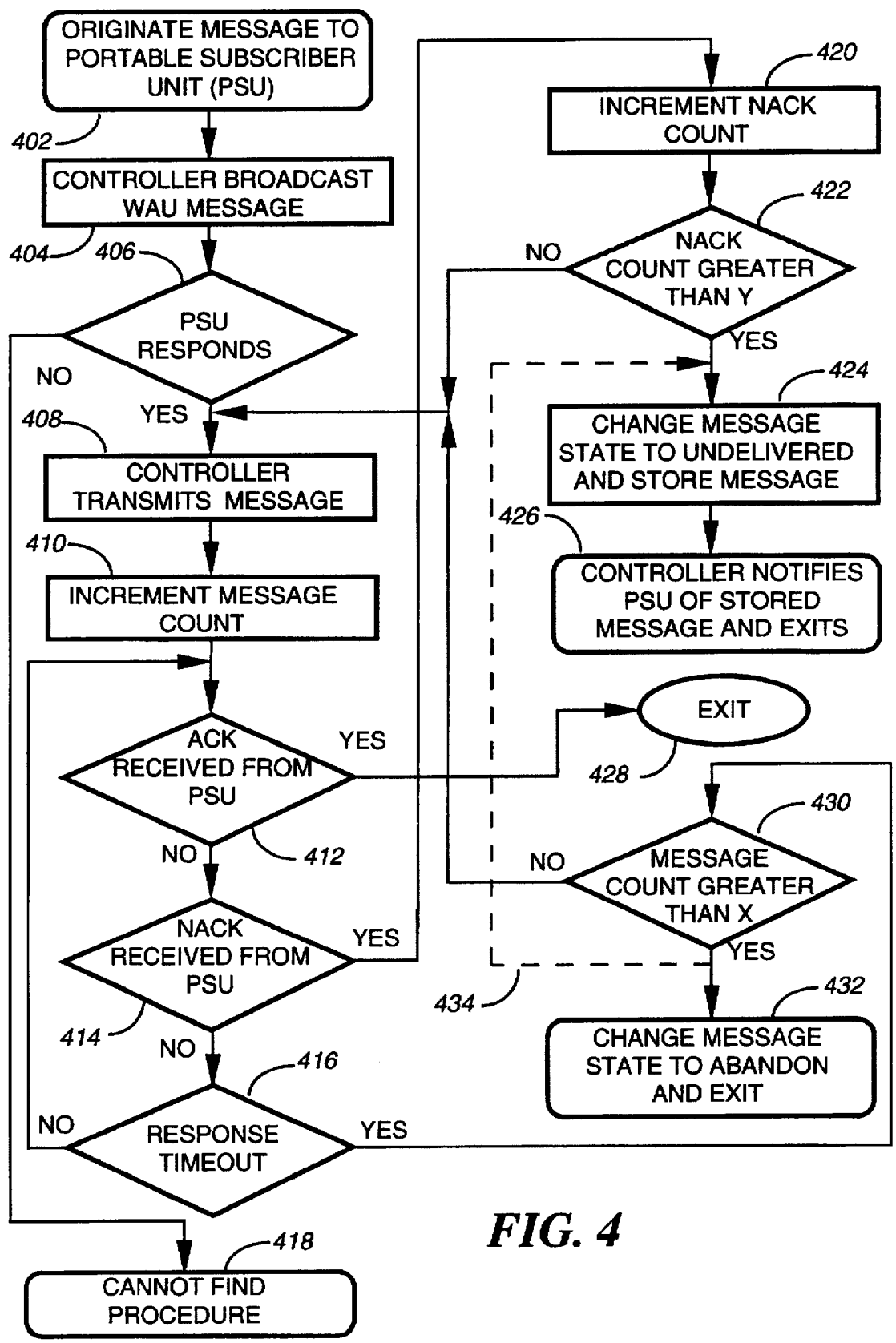
FIG. 4 is a flow chart describing the message handling process that takes place in the controller shown in FIG. 2, in accordance with the preferred embodiment of the present invention.

FIG. 4 is a flow chart describing a method which includes the unique aspects of the message handling function performed by the processing system 204 in accordance with the preferred embodiment of this invention. At step 402 a first message is originated for transmission to the PSU 106 and an associated message transmit count (message count) is initialized to zero. Next the processing system 204 generates a where are you (WAU) message in step 404, which is transmitted by using one or more transmitter/receiver 103. The WAU message is used to locate the PSU 106. When the PSU 106 does not respond with a hear I am (HIA) in step 406 the process goes to step 418 and the first message is handled in a conventional manner, such as, for example, by returning the message to the originator. When in step 406 the PSU 106 does respond with a HIA message, the processing system 204 identifies the location of the PSU 106 by the region from which the HIA message was received and in step 408 the processing system 204 proceeds to generate the first message which is transmitted from the cell site controller 202 to a transmitter/receiver 103 associated with the location identified in step 406 and transmitted therefrom. In step 410 the message count is incremented. Next in step 412 the processing system 204 tests to determine if a acknowledgment (ACK) has been received from the PSU 106 indicating that the first message was successfully received. Upon receiving such an ACK at step 412, a state of the first message is changed from "delivery pending" to "delivered", and the handling of the first message is completed at step 428. When in step 412 no ACK is received the processing system tests to determine if a non-acknowledgment (NACK) has been received at step 414. A NACK is transmitted by the PSU 106 when a quality indication of the message received is determined by the PSU 106 to be less than a predetermined limit. When a NACK is not received the processing system 204 tests to determine if a predetermined time limit for a response has been exceeded at step 416. When the predetermined time limit for a response has not been exceeded at step 416, the processing system 204 continues at step 412 and repeats the steps 412, 414, and 416 until one of the conditions specified in steps 412, 414, and 416 is met.

When in step 414 a NACK is received the processing system increments a count of the NACKs received at step 420. Next, in step 422 a test is made to determine if the number of NACKs received exceeds a predetermined number, Y, by reading the NACK count incremented in step 420. When the number of NACKs received does not exceed the predetermined number, Y, the processing system 204 transmits the first message again at step 408 and the processing system 204 repeats the steps of the method described above. Alternatively, when in step 422 the number of NACKs received does exceed the predetermined number, Y, in accordance with the preferred embodiment of this invention, the message is determined to be undeliverable, and the processing system 204 stores the first message and changes the status of the first message to from "delivery pending" to "undelivered" at step 424. Then in step 426 the controller 102, notifies the PSU 106, preferably using a second message which has a substantially higher probability of successful reception. In response to receiving the second message, the PSU 106 presents the user with information which indicates that the first message is being stored. The PSU 106 can also indicate the action required for the user to retrieve the undelivered message.

When in step 416 the predetermined time limit for a response has been exceeded the processing system 204 tests to determine if a predetermined number, X, of transmissions of the first message has been exceeded at step 430 by comparing the message count incremented in step 410 to X. When the predetermined number, X, of transmissions of the first message has not been exceeded the processing system 204 transmits the first message again at step 408 and the method described above is repeated. When a predetermined number, X, of transmissions of the first message has been exceeded at step 430 the processing system 204 changes the state of the first message at step 432 to "abandoned" and returns the message to originator. Alternatively, when the first message is abandoned, a message is sent to the originator indicating that the first message was not delivered. It will be appreciated that the predetermined number, X, of transmissions is preferably greater than the predetermined number, Y, of NACKs.

Optionally, as indicated in by the dotted line 434 in FIG. 4, when a predetermined number of transmissions of the first message has been exceeded in step 430 the processing system 204 stores the first message and changes the status of the first message as described above in reference to step 424 and notifies the PSU 106 as described above in reference to step 426. It will be appreciated that the present invention is applicable to systems that do not incorporate a NACK when the option as indicated by the dotted line 434 is used instead of step 432.

Figure 5:
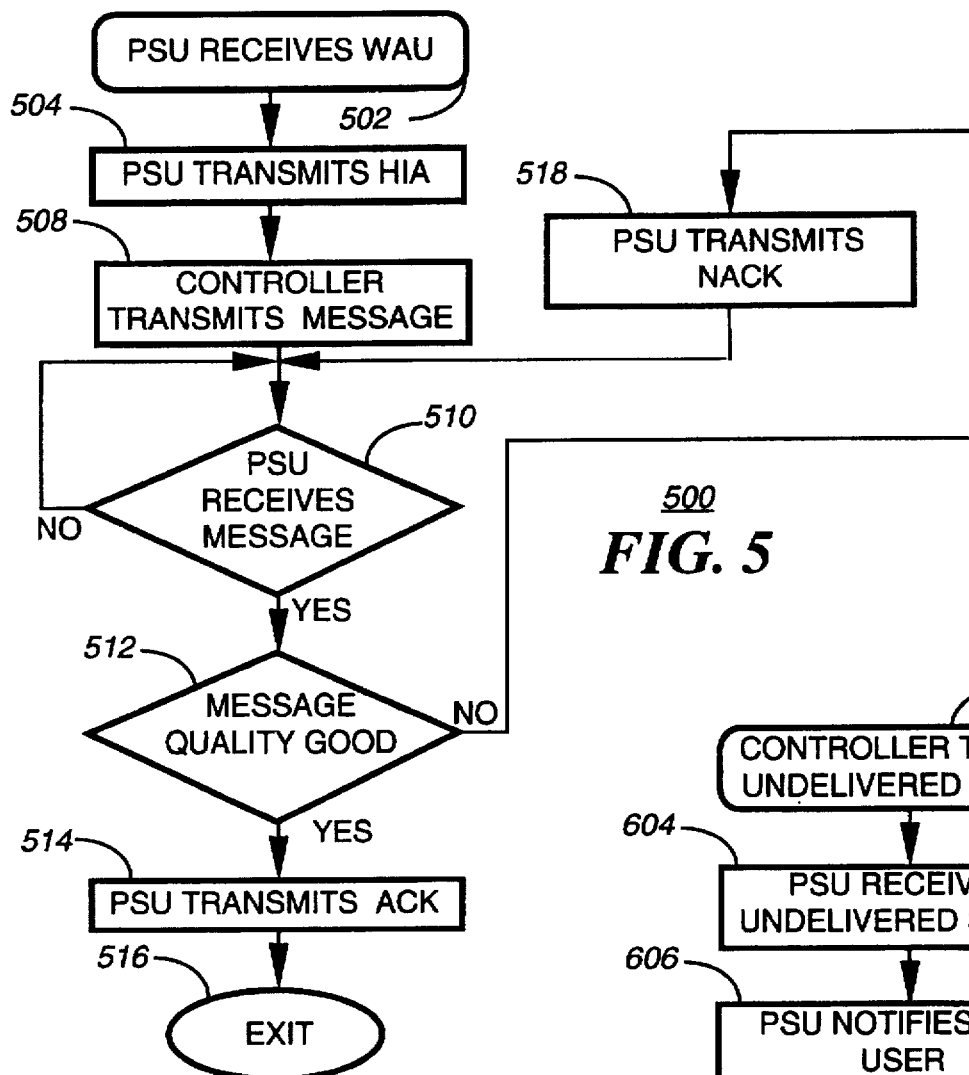
FIG. 5 is a flow chart describing the message handling process that takes place in the selective call receiver shown in FIG. 3, in accordance with the preferred embodiment of the present invention.

FIG. 5 is a flow chart describing a method which includes unique functions performed by the processing system 310 during the operation of the PSU 106 when the PSU 106 responds to certain actions of the controller 102 described in FIG. 4, in accordance with the preferred embodiment of the present invention. When the receiver 304 in the PSU 106 receives a WAU transmitted by the controller 102 at step 502 the PSU 106 responds with a HIA at step 504. The controller 102 transmits the first message in step 508. When the receiver 304 in the PSU 106 receives the first message in step 510, the processing system 310 of the PSU 106 determines the quality indication of received message in step 512.

When at step 510 the receiver 304 in the PSU 106 does not receive a message the processing system 310 continues to test for a message at step 510.

The quality indication is preferably determined by the processing system 310 from a signal to noise ratio measurement of the received signal to noise ratio of an outbound analog message or alternatively from a bit error rate (also called herein a bit error count) of a outbound digital message, or a combination of signal to noise and bit error rate measurement of an outbound message which includes both analog and digital portions. The quality indication is, for example, inversely proportional to a maximum error count of a plurality of error counts associated with a plurality of digital words, or is directly proportional to a signal noise ratio. For these examples, the quality indication must have a value in a range (called the "undeliverable range" ) between zero and a predetermined maximum limit, although it will be appreciated that other analytical relationships would be appropriate for other definitions of the quality indicator.

When the quality indication of the message received in step 510 exceeds the predetermined limit described above, the processing system 311 in the PSU 106 in step 514, generates a ACK and transmitter 308 transmits the ACK, and exits the process, going to the conventional process of storing the message and notifying the user in step 516. Alternatively when the quality indication of the message received in step 510 does not exceed the predetermined limit described above, the PSU 106, in step 518, the processing system 311 in the PSU 106 generates a NACK and the transmitter 308 transmits the NACK, and goes to step 510 anticipating the re-transmission of the message by the controller 102.

Figure 6:
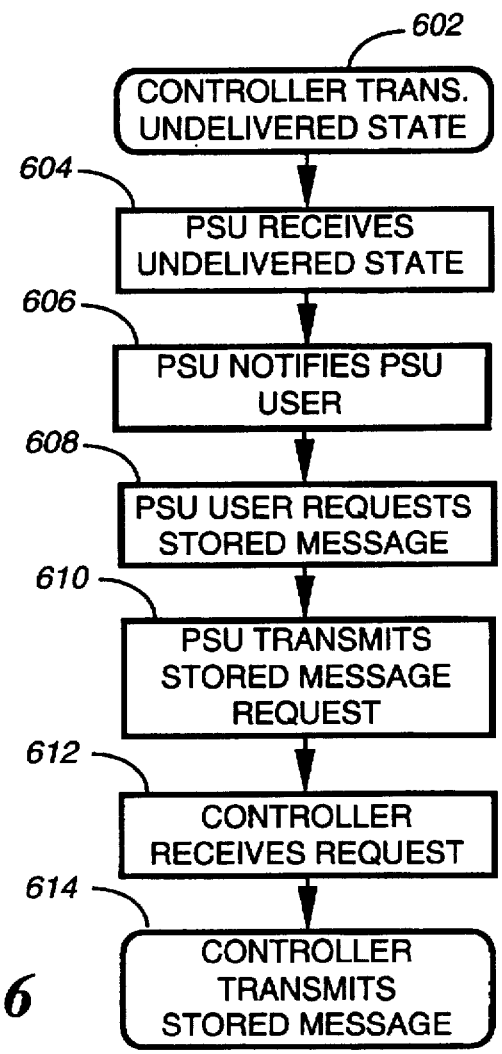
FIG. 6 is a flow chart describing the operation of the selective call receiver shown in FIG. 3 when responding to a notification of an undelivered and stored message and to a user's request for re-transmission of the stored message, in accordance with the preferred embodiments of the present invention.

FIG. 6 is a flow chart 600 describing a method which includes unique functions performed by the processing system 310 during the operation of the PSU 106 when PSU 106 responds to a notification by the controller 102 of an undelivered and stored message as described above with reference to step 426 of FIG. 4, in accordance with the preferred embodiment of the present invention. In step 602 the controller 102 transmits a second message indicating that the state of the first message has been changed to "undelivered" and the first message is stored. At step 604 the receiver 304 of PSU 106 receives the second message. The processing system 310 of PSU 106 determines from the second message that the message state of the first message is undelivered and that the first message has been stored. Next, at step 606 the processing system 310 generates user information which is presented on display 324 which notifies the user that a message is undelivered and is stored. At step 608 the PSU 106 user manipulates the user controls 320 to initiate a request that the stored message be retransmitted. Next at step 610 the processing system 310 generates a request for the controller 102 to re-transmit the stored message. The controller 102 receives the request transmitted by the transmitter 308 of PSU 106 at step 612 and at step 614 the controller 102 schedules the first message for re-transmission and re-transmits the first message.

Figure 7:
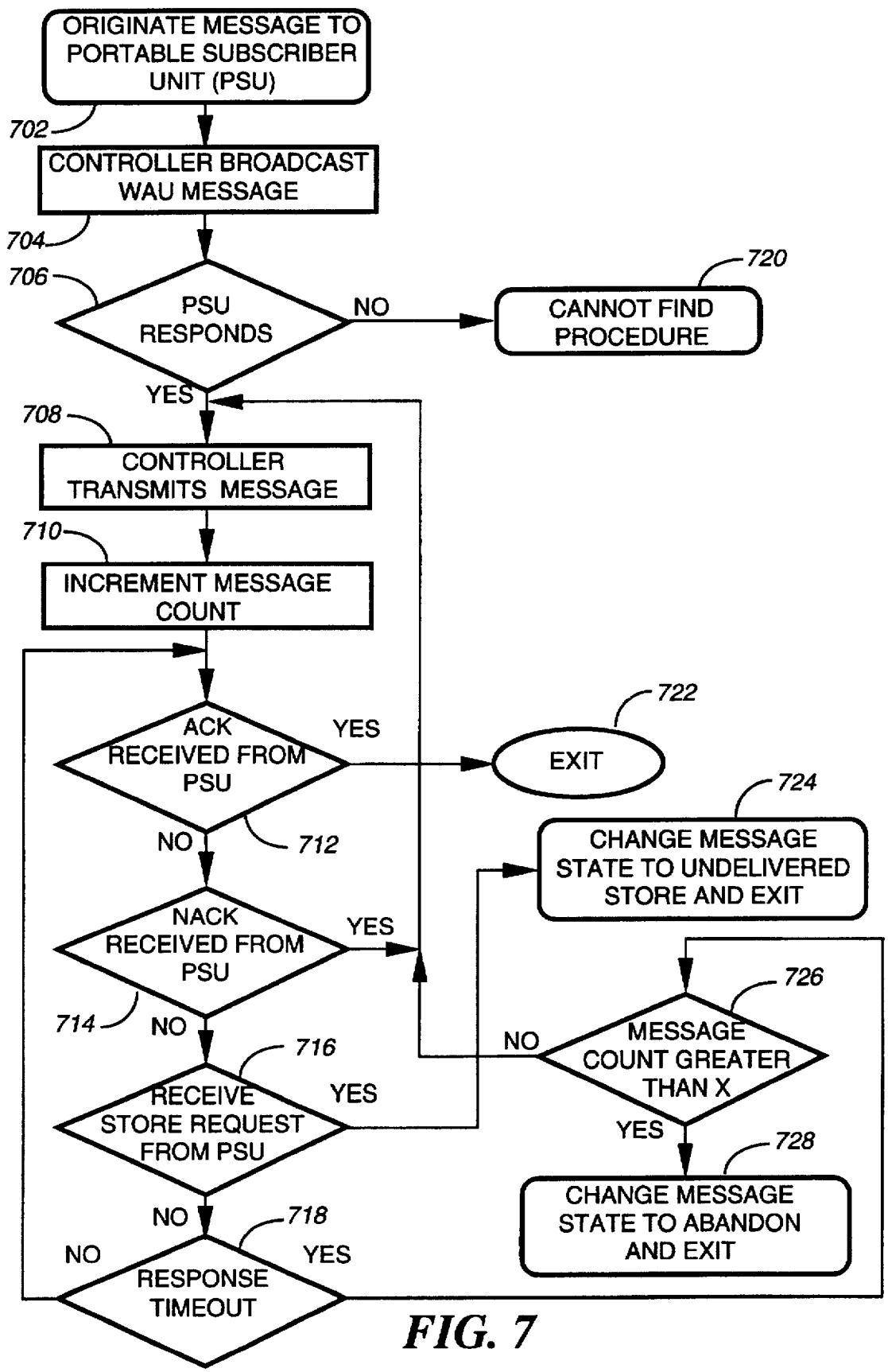
FIG. 7 is a flow chart describing the message handling process that takes place in the controller shown in FIG. 2, in accordance with the alternative embodiments of the present invention.

FIG. 7 is a flow chart describing a method which includes the unique aspects of the message handling function performed by the processing system 204 in accordance with an alternative embodiment of the present invention. The method described in FIG. 7 is similar to the method described in FIG. 4, differing in how the decision to store the message and change the status to "undelivered" is made. The decision to store the message and change the status to "undelivered" in FIG. 4 is made by the processing system 204 in the controller 102 where in FIG. 7 the decision is made by the processing system 310 in the PSU 106.

At step 702 a first message is originated for transmission to the PSU 106 and an associated message transmit count (message count) is initialized to zero. Next the processing system 204 generates a WAU message in step 704, which is transmitted by using one or more transmitter/receivers 103. The purpose of the WAU is described above in reference to FIG. 4. When the PSU 106 does not respond with a HIA in step 706 the processing system 204, at step 720, handles the first message in a conventional manner, such as, for example, by returning the message to the originator. When at step 706 the PSU 106 does respond with a HIA message, the processing system 204 identifies the location of the PSU 106, using the method described above in reference to FIG. 4, and at step 708 the processing system 204 proceeds to generates the first message for transmission to the PSU 106 in step 706. Next the message count is incremented at step 710. At step 712 the processing system 204 tests to determine if a ACK has been received from the PSU 106 indicating that the first message was successfully received. Upon receiving such an ACK, a state of the first message is changed from "delivery pending" to "delivered", and the handling of the first message is completed at step 722. When at step 712 no ACK is received the processing system 204 tests to determine if a NACK has been received at step 714. A NACK is transmitted by the PSU 106 when a quality indication of the message received is determined by the PSU 106 to be less than a predetermined limit. When a NACK is not received, then at step 716, the processing system 204 tests to determine if a message has been received from the PSU 106 requesting the processing system 204 to store the message and change the state of the first message to undelivered because a quality indication of the message received is determined by the PSU 106 to be less than a predetermined limit. When such a message is not received in step 716 the processing system 204 tests to determine if a predetermined time limit for a response has been exceeded at step 718. When the predetermined time limit for a response has not been exceeded at step 718, the processing system 204 continues at step 712 and repeats the steps 712, 714, 716 and 718 until one of the conditions specified at steps 712, 714, 716 and 718 are meet.

When at step 714 a NACK is received, the processing system 204, at step 708, transmits the first message again and the processing system 204 repeats the steps of the method described above. When at step 716 a message is been received from the PSU 106 requesting the processing system 204 to store the message and change the state of the first message to "undelivered", the processing system 204 stores the message and changes the state of the first message to undelivered, and the handling of the first message is completed. When in step 718 the predetermined time limit for a response has been exceeded the processing system 204 tests to determine if a predetermined number, X, of transmissions of the first message has been exceeded at step 726 by comparing the message count incremented in step 710 to X. When the predetermined number, X, of transmissions of the first message has not been exceeded, the processing system 204 transmits the first message again at step 708 and the steps of the method described above are repeated. When a predetermined number, X, of transmissions of the first message has been exceeded at step 726 the processing system 204 changes the state of the first message at step 728 to "abandoned" and returns the message to originator. Alternatively a message is sent to the originator indicating that the first message was not delivered.

Figure 8:
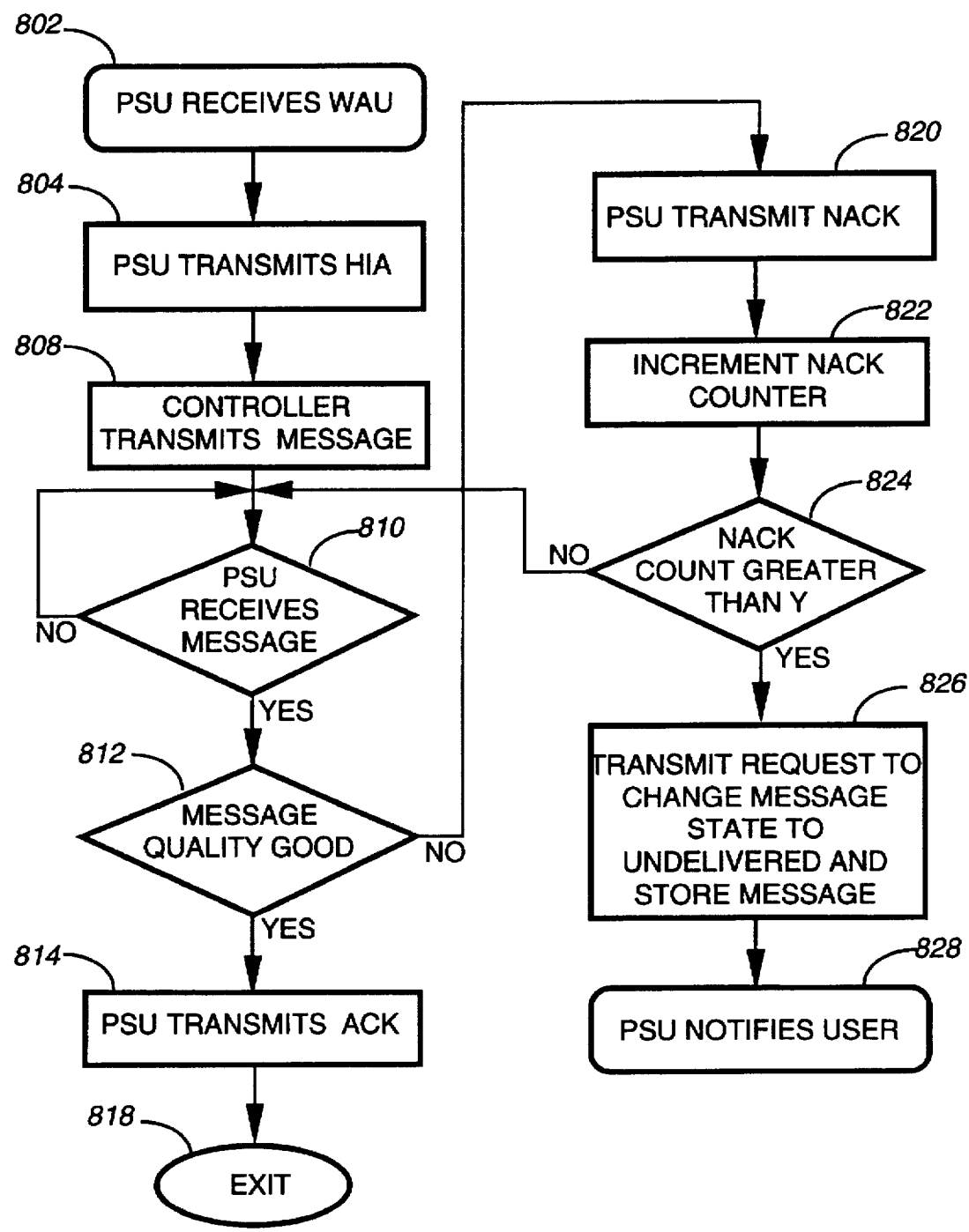
FIG. 8 is a flow chart describing the message handling process that takes place in the selective call receiver shown in FIG. 3, in accordance with the alternative embodiments of the present invention.

FIG. 8 is a flow chart describing a method which includes unique functions performed by the processing system 310 during the operation of the PSU 106 when the PSU 106 responds to certain actions of the controller 102 described in FIG. 7, in accordance with the alternative embodiment of the present invention. When the receiver 304, in the PSU 106 receives a WAU transmitted by the controller 102 at step 802, the PSU 106 responds with a HIA at step 804. The controller 102 transmits the first message at step 808. When the receiver 304, in the PSU 106, receives the first message at step 810, the processing system 310 of the PSU 106 determines the quality indication of received message at step 812. When at step 810 the receiver 304 in the PSU 106 does not receive a message the processing system 310 continues to test for a message at step 810. The quality indication is preferably determined by the processing system 310 as described above in reference to FIG. 5. When the quality indication of the message received in step 810 exceeds the predetermined limit described above, the PSU 106 in step 814, transmits a ACK, and exits the process, at step 818.

When the quality indication of the message received in step 810 does not exceed the predetermined limit, as described above in reference to FIG. 5, the processing system 310 generates a NACK and transmitter 308 transmits a NACK, at step 820, followed by the processing system 310 incrementing the NACK count at step 822. Next at step 824, the processing system 310 tests the NACK count, incremented in step 822, to determine if the NACK count exceeded a predetermined number, Y. When the number of NACKs received does not exceed the predetermined number, Y, the processing system 310 then goes to step 810, anticipating the re-transmission of the message by the controller 102. When at step 824 the NACK count exceeds the predetermined number, Y, in accordance with the alternate embodiment of this invention, the message is determined to be undeliverable by the processing system 310, the processing system 310 in step 826 generates a request which is transmitted by the transmitter 308 to the controller 102 requesting the storing of the first message and changing the status of the first message to from "delivery pending" to "undelivered". At step 828 the user is notified the a message could not be delivered and has been stored.

It will be appreciated that the system described in FIG. 8 can also be applied to a system not employing a NACK as well. The NACK count incremented in step 822 corresponds to the number of messages received in step 810 that do not exceed the predetermined quality indication limit as determined in step 812. Therefore it is apparent that in systems that do not employ a NACK, step 820 can be eliminated, step 822 can become a count of messages received that do not exceed the predetermined quality indication limit, described above and step 824 can compare the count of messages received that do not exceed the predetermined quality indication with a predetermined number Y. Step 826 will remain the same.

As can be seen by the description herein, the method, implemented by the present invention, of deferring the delivery of messages when the transmission impairments are being experienced frees channel time by eliminating unnecessary re-transmissions, and thus greatly enhances the channel utilization of the communication system. This enhancement helps to eliminate delays in delivering normal messages and greatly contributes to the customers satisfaction with the message delivery service being provided. Also, the delayed delivery of a message that would have been otherwise returned to the originator or abandoned is a much more satisfactory solution and improves customer satisfaction, contributing to the ultimate commercial success of the system.

We claim:

1. A method used in a radio communication system for delivering a message from a system controller to selective call device, the method comprising:

in the system controller the steps of
generating a first message intended for the selective call device;
changing a delivery state of the first message to undelivered after the first message has been transmitted at least once from the system controller; and
storing the first message in the system controller when the delivery state is changed to undelivered; and in the selective call device the steps of
determining that the first message is stored in the system controller; and
presenting user information which indicates that an undeliverable message is being stored by the system controller in response to determining that the first message is stored in the system controller, wherein the method further comprises:

in the system controller the steps of:
generating a second message intended for the selective call device which has a substantially higher probability of successful reception at the selective call device than the first message and which indicates that the first message is being stored, when the delivery state of the first message is changed to undelivered; and
transmitting the second message, and
wherein in the selective call device said step of determining is performed when the second message is received from the system controller.

2. A method used in a radio communication system for delivering a message from a system controller to a selective call device, the method comprising:

in the system controller the steps of
generating a first message intended for the selective call device;
changing a delivery state of the first message to undelivered after the first message has been transmitted at least once from the system controller; and
storing the first message in the system controller when the delivery state is changed to undelivered; and in the selective call device the steps of
determining that the first message is stored in the system controller; and
presenting user information which indicates that an undeliverable message is being stored by the system controller in response to determining that the first message is stored in the system controller, wherein said step of determining comprises a predetermined number of steps of:

receiving the first message in a transmission of the first message; and
determining that a quality indication of the first message received in said step of receiving is within an undeliverable range of values.

3. A method used in a radio communication system for delivering a message from a system controller to a selective call device, the method comprising:

in the system controller the steps of
generating a first message intended for the selective call device;
changing a delivery state of the first message to undelivered after the first message has been transmitted at least once from the system controller; and storing the first message in the system controller when the delivery state is changed to undelivered; and in the selective call device the steps of
determining that the first message is stored in the system controller; and
presenting user information which indicates that an undeliverable message is being stored by the system controller in response to determining that the first message is stored in the system controller, further comprising in the selective call device a step of generating and transmitting a non-acknowledgment (NACK) in response to receiving a transmission of the first message and determining that a quality indication of the first message is within an undeliverable range of values, and wherein the delivery state is changed to undelivered when a predetermined number of non-acknowledgments (NACKs) of the first message have been received from the selective call device, wherein each of said NACKs is generated by said step of generating and transmitting a NACK.

4. A selective call device for receiving a first message generated by a system controller of a radio communication system, the selective call device comprising:
a receiver which receives a second message from the system controller which indicates that a delivery state of the first message has been changed to undelivered, wherein the delivery state is maintained by the system controller;
a processing system, coupled to said receiver, wherein said processing system
determines that the first message is stored in the system controller when the second message is received, and
generates user information which indicates that an undeliverable message is being stored by the system controller when the second message is received; and
a display, coupled to said processing system, for displaying the user information.

5. The selective call device according to claim 4, further comprising a transmitter, coupled to said processing system, wherein said processing system further generates at least one non-acknowledgment (NACK) in response to determining that a quality indication of at least one prior reception of the first message is within an undeliverable range of values, and wherein said transmitter transmits the at least one NACK, and wherein the second message is received by the selective call device in response to at least one of the at least one NACK being received at a system controller.

6. The selective call device according to claim 5, wherein the first message is a digital message, and wherein quality indication is a bit error count.

7. The selective call device according to claim 5, wherein the first message is an analog message, and wherein the quality indication is a signal to noise indication.

8. A selective call device for receiving a first message generated by a system controller of a radio communication system, the selective call device comprising:
a receiver which receives the first message at least once from the system controller;
a processing system, coupled to said receiver, wherein said processing system
makes a determination that the first message is stored in the system controller in response to receiving a predetermined number of transmissions of the first message for which a quality indication is within an undeliverable range of values, and generates user information which indicates that the first message is being stored by the system controller in response to the determination; and
a display, coupled to said processing system, for displaying the user information.

9. The selective call device according to claim 8, further comprising a transmitter coupled to said processing system, wherein the processing system generates a non-acknowledgments (NACK) when a transmission of the first message is received for which a quality indication is within an undeliverable range of values, and wherein said transmitter transmit the NACK.

10. The selective call device according to claim 8, further comprising a transmitter coupled to said processing system, wherein said processing system further generates a second message for indicating to the system controller that the first message is to be stored for later delivery, and wherein said transmitter transmits the second message.

11. The selective call device according to claim 8, wherein the first message is a digital message, and wherein the quality indication is a bit error count.

12. The selective call device according to claim 8, wherein the first message is an analog message, and wherein the quality indication is a signal to noise indication.

13. A system controller for delivering a first message to a selective call device, the system controller comprising:
a processing system which
generates the first message intended for the selective call device,
changes a delivery state of the first message to undelivered after the first message has been transmitted at least once from the system controller, and stores the first message when the delivery state is changed to undelivered; and
a cell site controller, coupled to said processing system, for transmitting the first message, wherein the processing system further stores the first message when a second message is received from the selective call device, wherein the second message is a request for changing the delivery state of the first message.

14. A system controller for delivering a first message to a selective call device, the system controller comprising:
a processing system which
generates the first message intended for the selective call device,
changes a delivery state of the first message to undelivered after the first message has been transmitted at least once from the system controller, and stores the first message when the delivery state is changed to undelivered; and
a cell site controller, coupled to said processing system, for transmitting the first message, wherein the processing system further schedules the first message for re-transmission when a second message is received from the selective call device, wherein the second message is a request for re-transmission of the first message, and wherein said cell site controller re-transmits the first message.

15. A system controller for delivering a first message to a selective call device, the system controller comprising:
a processing system which
generates the first message intended for the selective call device,
changes a delivery state of the first message to undelivered after the first message has been transmitted at least once from the system controller, and stores the first message when the delivery state is changed to undelivered; and a cell site controller, coupled to said processing system for transmitting the first message wherein said processing system generates a second message intended for the selective call device when the delivery state of the first message is changed to undelivered, and wherein the second message indicates that the first message is being stored, and wherein the second message is formulated by said processing system to have substantially higher probability of successful reception at the selective call device than the first message, and wherein the cell site controller transmits the second message.

16. A system controller for delivering a first message to a selective call device, the system controller comprising:

a processing system which
  generates the first message intended for the selective call device,
  changed a delivery state of the first message to undelivered after the first message has been transmitted at least once from the system controller, and stores the first message when the delivery state is changed to undelivered; and a cell site controller, coupled to said processing system, for transmitting the first message, wherein said processing system changes the delivery state to undelivered when a predetermined number of non-acknowledgments (NACKs) of the first message have been received from the selective call device.

17. The system controller according to claim 16, wherein each of the predetermined number of NACKs is generated by said selective call device when a quality indicator for the first message is within an undeliverable range of values, wherein the quality indicator is determined within the selective call device from the first message received at the selective call device.

* * * * *

UNITED STATES PATENT AND TRADEMARK OFFICE
CERTIFICATE OF CORRECTION

PATENT NO.   : 5,703,570
DATED        : December 30, 1997
INVENTOR(S)  : Gorday et al.

It is certified that error appears in the above-identified patent and that said Letters Patent is hereby corrected as shown below:

Column 17, line 19, change "changed" to --changes--.

Signed and Sealed this

Twenty-first Day of December, 1999

Attest:

Q. TODD DICKINSON

*Attesting Officer*      *Acting Commissioner of Patents and Trademarks*